US012225485B2

(12) United States Patent
Sakhnini et al.

(10) Patent No.: US 12,225,485 B2
(45) Date of Patent: Feb. 11, 2025

(54) SYNCHRONIZATION SIGNAL BLOCK BURST WITH MULTIPLE SUBSETS

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 17/660,956

(22) Filed: Apr. 27, 2022

(65) Prior Publication Data

US 2022/0361125 A1    Nov. 10, 2022

Related U.S. Application Data

(60) Provisional application No. 63/184,008, filed on May 4, 2021.

(51) Int. Cl.
*H04W 56/00* (2009.01)
*H04L 5/00* (2006.01)
*H04W 74/0808* (2024.01)

(52) U.S. Cl.
CPC ....... *H04W 56/0015* (2013.01); *H04L 5/0048* (2013.01); *H04W 74/0808* (2013.01)

(58) Field of Classification Search
CPC ..... H04L 5/0048; H04L 5/001; H04L 5/0053; H04L 5/0094; H04W 56/0015; H04W 74/0808; H04B 7/0695
See application file for complete search history.

(56) References Cited

U.S. PATENT DOCUMENTS

| | | | |
|---|---|---|---|
| 2019/0053174 A1* | 2/2019 | Nangia | H04W 72/23 |
| 2020/0314673 A1* | 10/2020 | Deogun | H04B 7/0632 |
| 2020/0351841 A1* | 11/2020 | Cirik | H04W 48/08 |
| 2020/0396744 A1* | 12/2020 | Xiong | H04L 5/0051 |
| 2021/0153107 A1* | 5/2021 | Xu | H04L 5/005 |
| 2021/0168748 A1* | 6/2021 | Miao | H04W 48/16 |
| 2021/0235513 A1* | 7/2021 | Kim | H04W 74/0816 |
| 2021/0289455 A1* | 9/2021 | Sun | H04L 5/0051 |
| 2022/0263618 A1* | 8/2022 | Harada | H04W 56/0015 |
| 2022/0303925 A1* | 9/2022 | Hu | H04W 16/28 |
| 2022/0361125 A1* | 11/2022 | Sakhnini | H04B 7/0695 |
| 2023/0276385 A1* | 8/2023 | He | H04B 7/0408 370/503 |

* cited by examiner

*Primary Examiner* — Benjamin H Elliott, IV
(74) *Attorney, Agent, or Firm* — Harrity & Harrity, LLP

(57) ABSTRACT

Various aspects of the present disclosure generally relate to wireless communication. In some aspects, a user equipment (UE) may receive a synchronization signal block (SSB) configuration that indicates SSB location information associated with an SSB burst, the SSB location information indicating one or more SSB positions corresponding to at least one SSB position subset of a plurality of SSB position subsets. The UE may receive an SSB based at least in part on the SSB configuration. Numerous other aspects are described.

30 Claims, 9 Drawing Sheets

SYNCHRONIZATION SIGNAL BLOCK BURST WITH MULTIPLE SUBSETS

CROSS-REFERENCE TO RELATED APPLICATION

This Patent Application claims priority to U.S. Provisional Patent Application No. 63/184,008, filed on May 4, 2021, entitled "SYNCHRONIZATION SIGNAL BLOCK BURST WITH MULTIPLE SUBSETS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for synchronization signal block burst with multiple subsets.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: receive a synchronization signal block (SSB) configuration that indicates SSB location information associated with an SSB burst, the SSB location information indicating one or more SSB positions corresponding to at least one SSB position subset of a plurality of SSB position subsets; and receive an SSB based at least in part on the SSB configuration.

In some aspects, a base station for wireless communication includes a memory and one or more processors, coupled to the memory, configured to: transmit a SSB configuration that indicates SSB location information associated with an SSB burst, the SSB location information indicating one or more SSB positions corresponding to at least one SSB position subset of a plurality of SSB position subsets; and transmit an SSB based at least in part on the SSB configuration.

In some aspects, a method of wireless communication performed by a UE includes receiving an SSB configuration that indicates SSB location information associated with an SSB burst, the SSB location information indicating one or more SSB positions corresponding to at least one SSB position subset of a plurality of SSB position subsets; and receiving an SSB based at least in part on the SSB configuration.

In some aspects, a method of wireless communication performed by a base station includes transmitting an SSB configuration that indicates SSB location information associated with an SSB burst, the SSB location information indicating one or more SSB positions corresponding to at least one SSB position subset of a plurality of SSB position subsets; and transmitting an SSB based at least in part on the SSB configuration.

In some aspects, a non-transitory computer-readable medium storing a set of instructions for wireless communication includes one or more instructions that, when executed by one or more processors of a UE, cause the UE to: receive an SSB configuration that indicates SSB location information associated with an SSB burst, the SSB location information indicating one or more SSB positions corresponding to at least one SSB position subset of a plurality of SSB position subsets; and receive an SSB based at least in part on the SSB configuration.

In some aspects, a non-transitory computer-readable medium storing a set of instructions for wireless communication includes one or more instructions that, when executed by one or more processors of a base station, cause the base station to: transmit an SSB configuration that indicates SSB location information associated with an SSB burst, the SSB location information indicating one or more SSB positions corresponding to at least one SSB position subset of a plurality of SSB position subsets; and transmit an SSB based at least in part on the SSB configuration.

In some aspects, an apparatus for wireless communication includes means for receiving an SSB configuration that indicates SSB location information associated with an SSB burst, the SSB location information indicating one or more SSB positions corresponding to at least one SSB position subset of a plurality of SSB position subsets; and means for receiving an SSB based at least in part on the SSB configuration.

In some aspects, an apparatus for wireless communication includes means for transmitting an SSB configuration that indicates SSB location information associated with an SSB burst, the SSB location information indicating one or more SSB positions corresponding to at least one SSB position subset of a plurality of SSB position subsets; and means for transmitting an SSB based at least in part on the SSB configuration.

In some aspects, a method, device, apparatus, computer program product, non-transitory computer-readable medium, user equipment, base station, node, wireless communication device, and/or processing system as substantially described herein with reference to and as illustrated by the accompanying drawings and specification.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
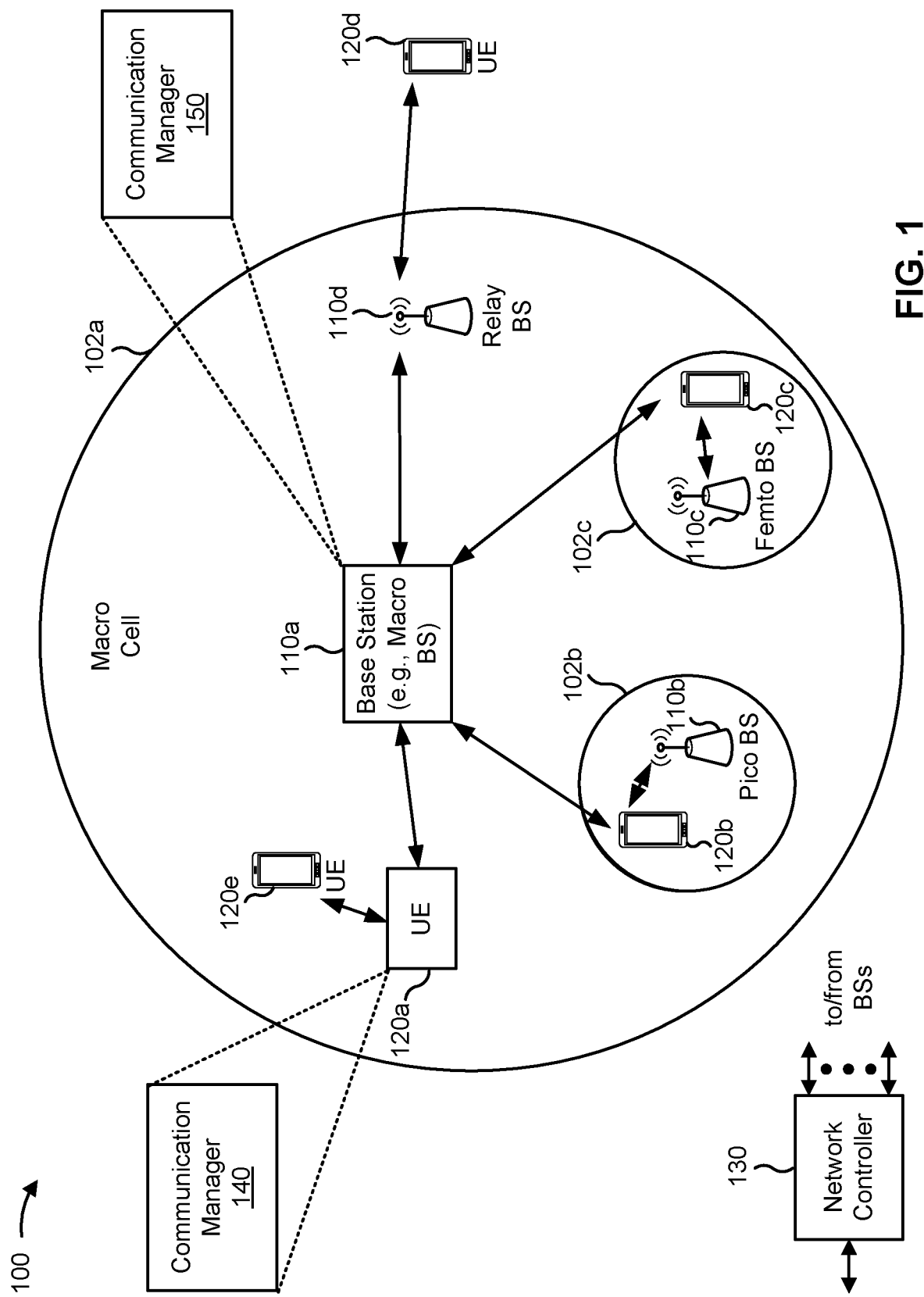
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a synchronization signal block (SSB) configuration that indicates SSB location information associated with an SSB burst, the SSB location information indicating one or more SSB positions corresponding to at least one SSB position subset of a plurality of SSB position subsets; and receive an SSB based at least in part on the SSB configuration. Additionally, or alternatively, the communication manager 140 may perform one or more other operations described herein.

In some aspects, the base station 110 may include a communication manager 150. As described in more detail elsewhere herein, the communication manager 150 may transmit an SSB configuration that indicates SSB location information associated with an SSB burst, the SSB location information indicating one or more SSB positions corresponding to at least one SSB position subset of a plurality of SSB position subsets; and transmit an SSB based at least in part on the SSB configuration. Additionally, or alternatively, the communication manager 150 may perform one or more other operations described herein.

As indicated above, FIG. 1 is provided as an example. Other examples may differ from what is described with regard to FIG. 1.

Figure 2:
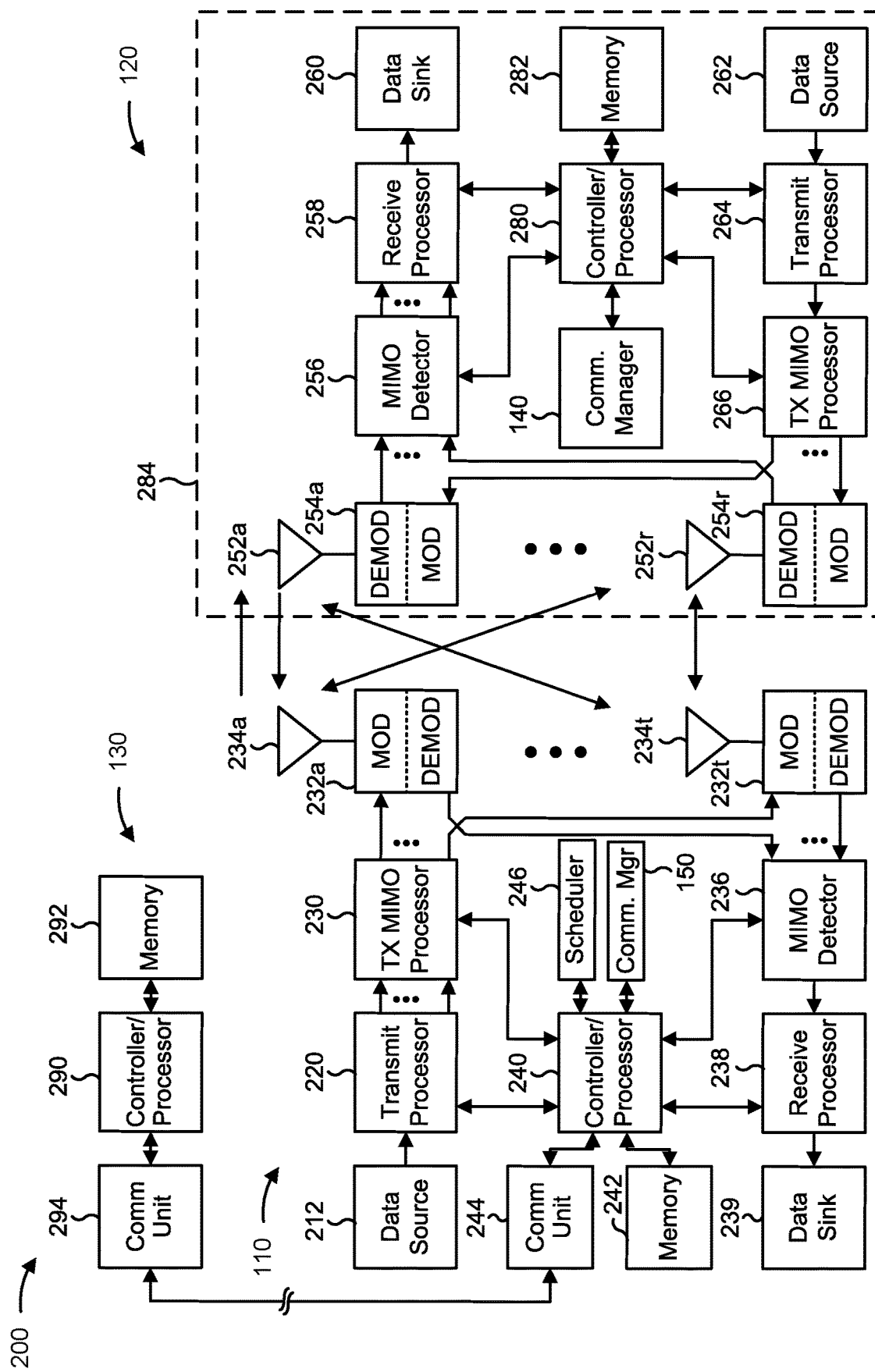
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

In some aspects, the term "base station" (e.g., the base station 110) may refer to an aggregated base station, a disaggregated base station, an integrated access and backhaul (IAB) node, a relay node, and/or one or more components thereof. For example, in some aspects, "base station" may refer to a central unit (CU), a distributed unit (DU), a radio unit (RU), a Near-Real Time (Near-RT) RAN Intelligent Controller (MC), or a Non-Real Time (Non-RT) RIC, or a combination thereof. In some aspects, the term "base station" may refer to one device configured to perform one or more functions, such as those described herein in connection with the base station 110. In some aspects, the term "base station" may refer to a plurality of devices configured to perform the one or more functions.

At the UE 120, a set of antennas 252 (shown as antennas 252a through 252t) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252t) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with SSB burst with multiple subsets, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving an SSB configuration that indicates SSB location information associated with an SSB burst, the SSB location information indicating one or more SSB positions corresponding to at least one SSB position subset of a plurality of SSB position subsets; and/or means for receiving an SSB based at least in part on the SSB configuration. The means for the UE to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, the base station includes means for transmitting an SSB configuration that indicates SSB location information associated with an SSB burst, the SSB location information indicating one or more SSB positions corresponding to at least one SSB position subset of a plurality of SSB position subsets; and/or means for transmitting an SSB based at least in part on the SSB configuration. The means for the base station to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
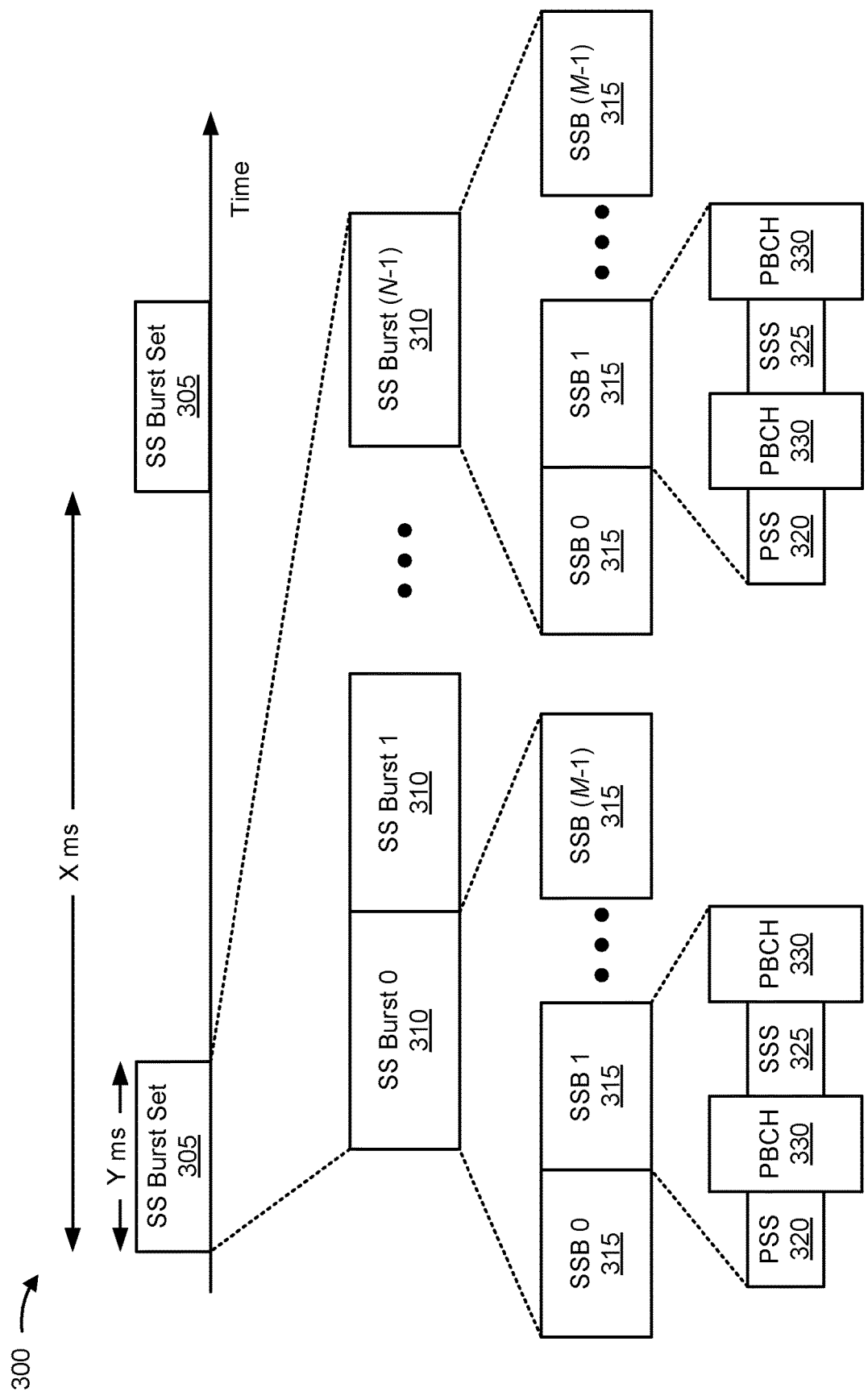
FIG. 3 is a diagram illustrating an example of a synchronization signal (SS) hierarchy, in accordance with the present disclosure.

FIG. 3 is a diagram illustrating an example 300 of a synchronization signal (SS) hierarchy, in accordance with the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SSBs 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for cell search, cell acquisition, beam management, and/or beam selection (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window or an SSB measurement time configuration (SMTC) window.

In some aspects, an SSB 315 may include resources that carry a PSS 320, an SSS 325, and/or a physical broadcast channel (PBCH) 330. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In this case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure and/or a cell search procedure, among other examples. Based at least in part on the monitoring and/or measuring, the UE 120 may indicate one or more SSBs 315 with a best signal parameter (e.g., an RSRP parameter) to a base station 110. The base station 110 and the UE 120 may use the one or more indicated SSBs 315 to select one or more beams to be used for communication between the base station 110 and the UE 120 (e.g., for a random access channel (RACH) procedure). Additionally, or alternatively, the UE 120 may use the SSB 315 and/or the SSB index to determine a cell timing for a cell via which the SSB 315 is received (e.g., a serving cell).

As indicated above, FIG. 3 is provided as an example. Other examples may differ from what is described with regard to FIG. 3.

For operation with shared spectrum channel access (e.g., NR in unlicensed spectrum ("NR-U")), a UE can assume that transmission of SSBs in a half frame is within a discovery burst transmission window (DRS tx window) that starts from the first symbol of the first slot in a half-frame. A discovery burst transmission window may be referred to as a DRS transmission window.

To provide more reliability in SSB delivery with medium uncertainty, more candidate SSBs for a certain beam and/or quasi co-location (QCL) can be introduced within the DRS transmission window. In some cases, the maximum DRS transmission window duration can be 5 milliseconds (ms). The DRS transmission window duration can be configured as 0.5 ms, 1 ms, 2 ms, 3 ms, 4 ms, or 5 ms. If the DRS transmission window duration is not known, a UE may assume the DRS transmission window has a duration of 5 ms. The maximum number of SSBs in a cell can be 8, and the maximum number of candidate SSBs within a DRS transmission window can be 10 for subcarrier spacing (SCS)=15 kHz and 20 for SCS=30 kHz.

Figure 5:
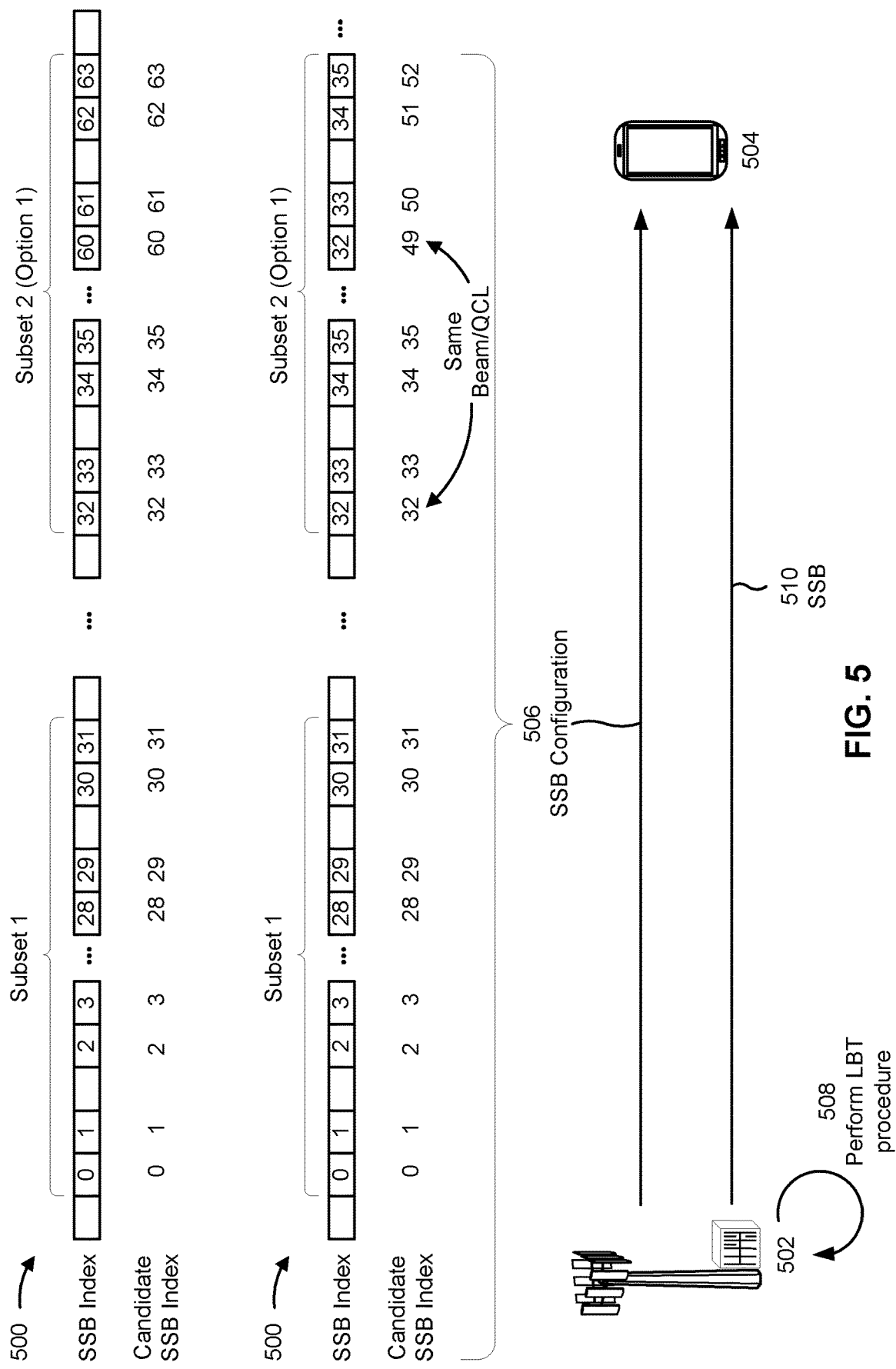
FIG. 5 is a diagram illustrating an example associated with SSB burst with multiple subsets, in accordance with the present disclosure.

FIG. 5 is a diagram illustrating an example 500 of QCL associated with candidate SSB positions, in accordance with the present disclosure. As shown by example 500, a number of candidate SSB positions may be provided within a DRS transmission window. Each of the plurality of candidate SSB positions may be identified using a candidate SSB index, as shown.

Out of the candidate SSB positions, multiple wraparound transmission opportunities for each SSB QCL can be provided. In this way, for one SSB with a certain QCL, if the look-before-talk (LBT) fails for its transmission, another opportunity can exist in the same DRS transmission window.

Example 500 illustrates this wraparound concept for a DRS transmission window having SCS=30 kHz. The UE can be aware of the QCL relationship between SSBs using a relationship index, $N_{SSB}^{QCL}$. The SSB index can be expressed in terms of a PBCH DMRS index, as modulo (PBCH DMRS sequence index, $N_{SSB}^{QCL}$) or in terms of a candidate SSB index, as modulo(Candidate SSB index, $N_{SSB}^{QCL}$). The DRS transmission window of Example 005 has a relationship index of $N_{SSB}^{QCL}$=8.

For a given cell, a UE may assume that SSBs in the same candidate position within the DRS transmission window are QCLed across DRS transmission windows. From a UE's perspective, the number of transmitted SSBs within a DRS transmission window is not larger than $N_{SSB}^{QCL}$. The range of $N_{SSB}^{QCL}$ is {1, 2, 4, 8} and is indicated by a master information block (MIB) (for initial access) or dedicated radio resource control (RRC) signaling (for radio resource management (RRM)).

For an un-licensed mode of operation (e.g., NR-U), a transmission may be transmitted under an exemption for un-licensed operation referred to as a short control signal exemption if its duration does not exceed 10 ms within an observation period of 100 ms. For SCS=120 kHz, assuming 64 beams and an SSB periodicity of 20 ms, the SSB transmission duration is approximately 11.4 ms within a 100 ms period, which exceeds the allowed limit to classify as short control signal transmission. The maximum number of beams that can be configured without exceeding this limit is 56. However, in some NR implementations, 64 or more SSB beams may be supported. Thus, un-licensed modes of operation may not be able to utilize the available SSB beams, thereby reducing reliability, which may have a negative impact on network performance.

Some aspects of the techniques and apparatuses described herein may facilitate transmission of a subset of a total number of SSBs using the short control signal exemption. For initial access, the UE may not need to know which SSBs are transmitted and which SSBs are not transmitted. Thus, it can be left to network implementation to select which SSBs subset is transmitted. For non-initial access, the UE may need to know the exact location of the SSB to facilitate measuring the SSBs for beam management and other processes. Thus, aspects of the techniques described herein may provide for a base station to signal an indication of an SSB configuration to the UE.

In some aspects, for example, the base station may transmit an SSB configuration to a UE. The SSB configuration may indicate SSB location information associated with an SSB burst. In some aspects, the SSB location information may indicate one or more SSB positions corresponding to at least one SSB position subset of a plurality of SSB position subsets. The base station may transmit, and the UE may receive, an SSB based at least in part on the SSB configuration. In this way, some aspects may facilitate transmission of SSBs using a short control signal exemption. In this way, some aspects may improve reliability, which may have a positive impact on network performance.

Figure 4:
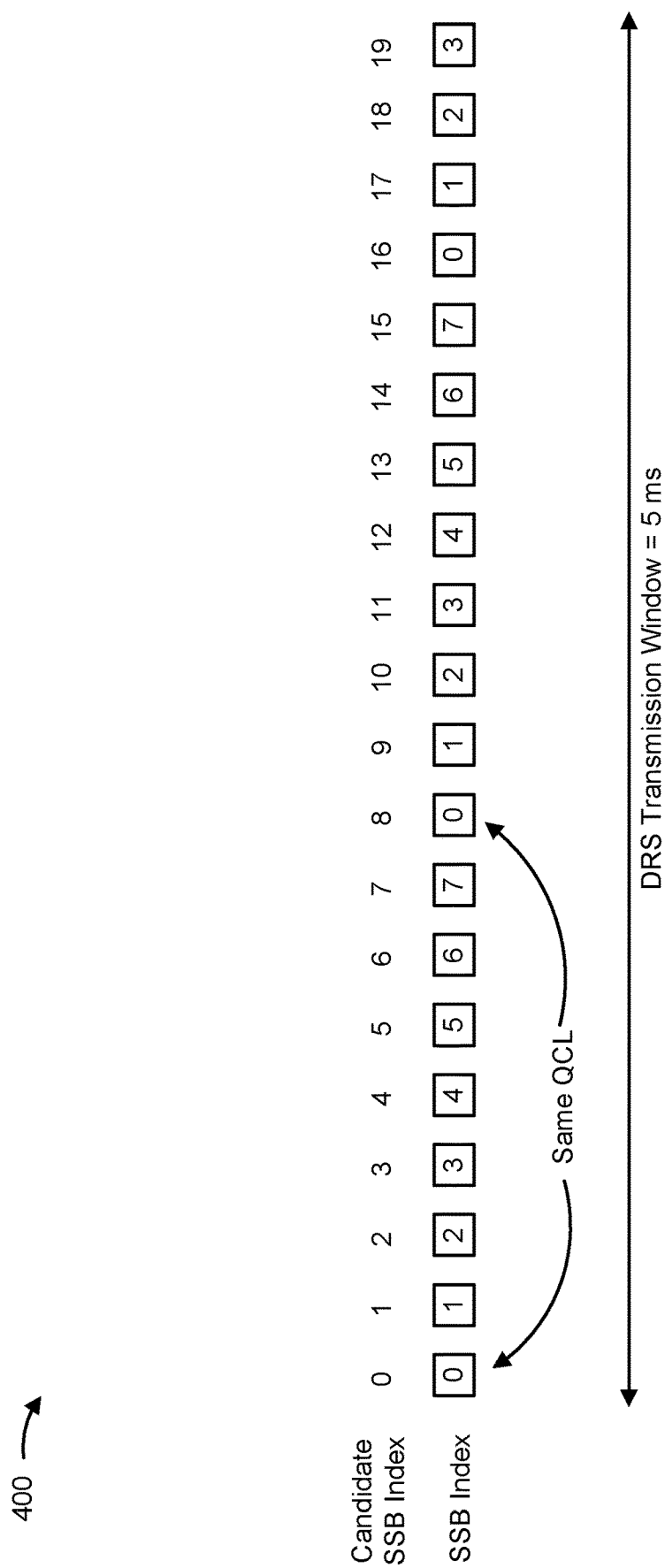
FIG. 4 is a diagram illustrating an example of quasi co-location (QCL) associated with candidate SS block (SSB) positions, in accordance with the present disclosure.

As indicated above, FIG. 4 is provided as an example. Other examples may differ from what is described with regard to FIG. 4.

FIG. 5 is a diagram illustrating an example 500 associated with SSB burst with multiple subsets, in accordance with the present disclosure. As shown in FIG. 5, a base station 110 and a UE 120 may communicate with one another.

As shown by reference number 505, the base station 110 may transmit, and the UE 120 may receive, an SSB configuration. In some aspects, the SSB configuration may indicate SSB location information associated with an SSB burst. In some aspects, the SSB location information may indicate one or more SSB positions corresponding to at least one SSB position subset of a plurality of SSB position subsets. In some aspects, the base station 110 may transmit the SSB configuration by transmitting a configuration transmission that indicates the SSB configuration. In some aspects, for example, the configuration transmission may include an RRC message, a medium access control control element (MAC-CE), and/or a downlink control information (DCI) transmission, among other examples.

In some aspects, the SSB configuration may include one or more configuration parameters. The one or more configuration parameters may indicate at least one of one or more subset parameters corresponding to the at least one SSB position subset, an association between at least one SSB candidate position of the SSB burst and the at least one SSB position subset, or an LBT condition associated with the SSB burst.

In some aspects, for example, the at least one SSB position subset may include a first subset comprising at least one SSB beam corresponding to at least one SSB that is transmitted using a short control signal exemption. A maximum number of SSB beams associated with the first subset may be less than a maximum number of SSB beams associated with a transmission window.

In some aspects, a maximum number of SSB beams associated with the first subset may be less than or equal to a maximum number of SSB beams that can be transmitted using short control signal exemption within a transmission window. For example, if 64 is the maximum number of beams that can be transmitted, and 56 is the maximum number that can satisfy the short control signal exemption, the first subset may include up to 56 beams. In some aspects, the first subset may include SSB beams 1-32, which may always be present. In some aspects, the first subset may include a plurality of contiguous SSB positions. In some aspects, the first subset may include at least one pair of consecutive SSB positions that are not contiguous.

In some aspects, the at least one SSB position subset includes a second subset having an associated LBT condition for transmitting an SSB associated with the second subset. A maximum number of SSB beams associated with the second subset may be less than a maximum number of SSB beams associated with a transmission window. In some aspects, the second subset may be empty. In some aspects, a transmission window corresponding to the SSB burst may include one SSB candidate position associated with the second subset (indicated as "Option 1" in FIG. 5). In that case, for example, if LBT fails for the one opportunity, no transmission may occur for the corresponding beam in that SSB. In some aspects, more than one SSB candidate position may be associated with the second subset (indicated as "Option 2" in FIG. 5). For example, in that case, if LBT fails for one opportunity, other opportunities may be available within the SSB burst. In some aspects, the second subset may include a plurality of contiguous SSB positions. In some aspects, the second subset may include at least one pair of consecutive SSB positions that are not contiguous.

As shown in FIG. 5, the beams included in a subset may be changed over different SSB bursts. In some examples, an SSB beam (or a plurality of SSB beams) may be associated with a first SSB position subset for an SSB burst, and the SSB beam (or a plurality of SSB beams) may be associated with a second SSB position subset for an additional SSB burst. For example, for a first SSB burst, the first subset ("Subset 1") may include beams 1-32, and the second subset ("Subset 2") may include beams 33-48. For a second burst, the first subset may include beams 33-64, and the second subset may include beams 1-16. For a third SSB burst, the first subset may include beams 1-32, and the second subset may include beams 49-64. For a fourth SSB burst, the first subset may include beams 33-64, and the second subset may include beams 17-32.

In some aspects, a first rate matching configuration may correspond to a first SSB position subset of the plurality of SSB position subsets, and a second rate matching configuration may correspond to a second SSB position subset of the plurality of SSB position subsets. A first rate matching configuration may correspond to the SSB burst, and a second rate matching configuration may correspond to a second SSB burst. In some aspects, the second rate matching configuration may correspond to the second SSB burst based at least in part on a determination that the second SSB burst has an associated LBT condition. The second rate matching configuration may correspond to the second SSB burst based at least in part on a determination that an association between at least one SSB candidate position of the second SSB burst and the at least one SSB position subset satisfies a rate matching condition.

As shown by reference number 510, the base station 110 may perform an LBT procedure. Based at least in part on the LBT procedure, the base station 110 may select the first subset, the second subset, and/or another subset for transmission. As shown by reference number 515, the base station 110 may transmit, and the UE 120 may receive, an SSB based at least in part on the SSB configuration.

In some aspects, the base station 110 may transmit the SSB by transmitting an SSB transmission corresponding to the one SSB candidate position based at least in part on a determination that the LBT condition is satisfied by the one SSB candidate position. A transmission window corresponding to the SSB burst may include a plurality of SSB candidate positions associated with the second subset.

In some aspects, the base station 110 may transmit the SSB by transmitting an SSB transmission based at least in part on a determination that the LBT condition is satisfied by at least one of the plurality of SSB candidate positions associated with the second subset. In some aspects, the base station 110 may transmit the SSB by transmitting an SSB transmission based at least in part on a determination that an LBT condition associated with the SSB burst is satisfied. In some aspects, the SSB burst may include a plurality of SSBs, and the base station 110 may transmit the SSB by transmitting at least one of the plurality of SSBs transmitted based at least in part on the determination that the LBT condition associated with the SSB burst is satisfied As indicated above, FIG. 5 is provided as an example. Other examples may differ from what is described with respect to FIG. 5.

Figure 6:
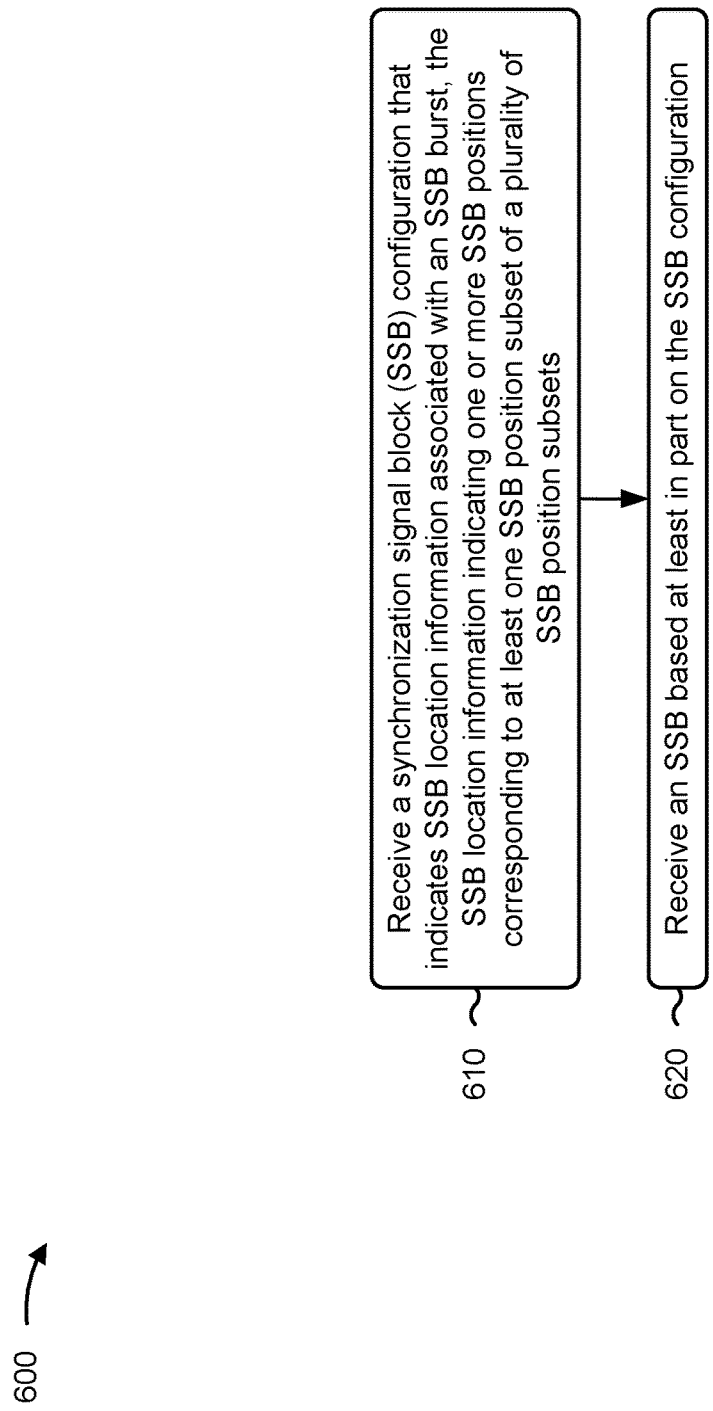
FIGS. 6 and 7 are diagrams illustrating example processes associated with SSB burst with multiple subsets, in accordance with the present disclosure.

FIG. 6 is a diagram illustrating an example process 600 performed, for example, by a UE, in accordance with the present disclosure. Example process 600 is an example where the UE (e.g., UE 504) performs operations associated with SSB burst with multiple subsets.

As shown in FIG. 6, in some aspects, process 600 may include receiving an SSB configuration that indicates SSB location information associated with an SSB burst, the SSB location information indicating one or more SSB positions corresponding to at least one SSB position subset of a plurality of SSB position subsets (block 610). For example, the UE (e.g., using communication manager 140 and/or reception component 802, depicted in FIG. 8) may receive an SSB configuration that indicates SSB location information associated with an SSB burst, the SSB location information indicating one or more SSB positions corresponding to at least one SSB position subset of a plurality of SSB position subsets, as described above.

As further shown in FIG. 6, in some aspects, process 600 may include receiving an SSB based at least in part on the SSB configuration (block 620). For example, the UE (e.g., using communication manager 140 and/or reception component 802, depicted in FIG. 8) may receive an SSB based at least in part on the SSB configuration, as described above.

Process 600 may include additional aspects, such as any single aspect or any combination of aspects described below and/or in connection with one or more other processes described elsewhere herein.

In a first aspect, the at least one SSB position subset includes a first subset comprising at least one SSB beam corresponding to at least one SSB that is transmitted using a short control signal exemption.

In a second aspect, alone or in combination with the first aspect, a maximum number of SSB beams associated with the first subset is less than a maximum number of SSB beams associated with a transmission window.

In a third aspect, alone or in combination with one or more of the first and second aspects, a maximum number of SSB beams associated with the first subset is less than or equal to a maximum number of SSB beams that can be transmitted using short control signal exemption within a transmission window.

In a fourth aspect, alone or in combination with one or more of the first through third aspects, the first subset includes a plurality of contiguous SSB positions.

In a fifth aspect, alone or in combination with one or more of the first through third aspects, the first subset includes at least one pair of consecutive SSB positions that are not contiguous.

In a sixth aspect, alone or in combination with one or more of the first through fifth aspects, the at least one SSB position subset includes a second subset having an associated LBT condition for transmitting an SSB associated with the second subset.

In a seventh aspect, alone or in combination with the sixth aspect, a maximum number of SSB beams associated with the second subset is less than a maximum number of SSB beams associated with a transmission window.

In an eighth aspect, alone or in combination with one or more of the sixth through seventh aspects, the second subset is empty.

In a ninth aspect, alone or in combination with one or more of the sixth through eighth aspects, a transmission window corresponding to the SSB burst includes one SSB candidate position associated with the second subset.

In a tenth aspect, alone or in combination with the ninth aspect, receiving the SSB comprises receiving an SSB transmission corresponding to the one SSB candidate position based at least in part on a determination that the LBT condition is satisfied by the one SSB candidate position.

In an eleventh aspect, alone or in combination with one or more of the sixth through tenth aspects, a transmission window corresponding to the SSB burst includes a plurality of SSB candidate positions associated with the second subset.

In a twelfth aspect, alone or in combination with the eleventh aspect, receiving the SSB comprises receiving an SSB transmission based at least in part on a determination that the LBT condition is satisfied by at least one of the plurality of SSB candidate positions associated with the second subset.

In a thirteenth aspect, alone or in combination with one or more of the sixth through twelfth aspects, the second subset includes a plurality of contiguous SSB positions.

In a fourteenth aspect, alone or in combination with one or more of the sixth through thirteenth aspects, the second subset includes at least one pair of consecutive SSB positions that are not contiguous.

In a fifteenth aspect, alone or in combination with one or more of the first through fourteenth aspects, an SSB beam is associated with a first SSB position subset for the SSB burst, and wherein the SSB beam is associated with a second SSB position subset for an additional SSB burst.

In a sixteenth aspect, alone or in combination with one or more of the first through fifteenth aspects, receiving the SSB comprises receiving an SSB transmission based at least in part on a determination that an LBT condition associated with the SSB burst is satisfied.

In a seventeenth aspect, alone or in combination with the sixteenth aspect, the SSB burst comprises a plurality of SSBs, and wherein receiving the SSB comprises receiving at least one of the plurality of SSBs transmitted based at least in part on the determination that the LBT condition associated with the SSB burst is satisfied.

In an eighteenth aspect, alone or in combination with one or more of the first through seventeenth aspects, receiving the SSB configuration comprises receiving a configuration transmission that indicates the configuration, the configuration transmission comprising at least one of an RRC message, a MAC-CE, or a DCI transmission.

In a nineteenth aspect, alone or in combination with one or more of the first through eighteenth aspects, the SSB configuration comprises one or more configuration parameters, the one or more configuration parameters indicating at least one of one or more subset parameters corresponding to the at least one SSB position subset, an association between at least one SSB candidate position of the SSB burst and the at least one SSB position subset, or an LBT condition associated with the SSB burst.

In a twentieth aspect, alone or in combination with one or more of the first through nineteenth aspects, a first rate matching configuration corresponds to a first SSB position subset of the plurality of SSB position subsets, and wherein a second rate matching configuration corresponds to a second SSB position subset of the plurality of SSB position subsets.

In a twenty-first aspect, alone or in combination with one or more of the first through twentieth aspects, a first rate matching configuration corresponds to the SSB burst, and wherein a second rate matching configuration corresponds to a second SSB burst.

In a twenty-second aspect, alone or in combination with the twenty-first aspect, the second rate matching configuration corresponds to the second SSB burst based at least in part on a determination that the second SSB burst has an associated LBT condition.

In a twenty-third aspect, alone or in combination with the twenty-second aspect, the second rate matching configuration corresponds to the second SSB burst based at least in part on a determination that an association between at least one SSB candidate position of the second SSB burst and the at least one SSB position subset satisfies a rate matching condition.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
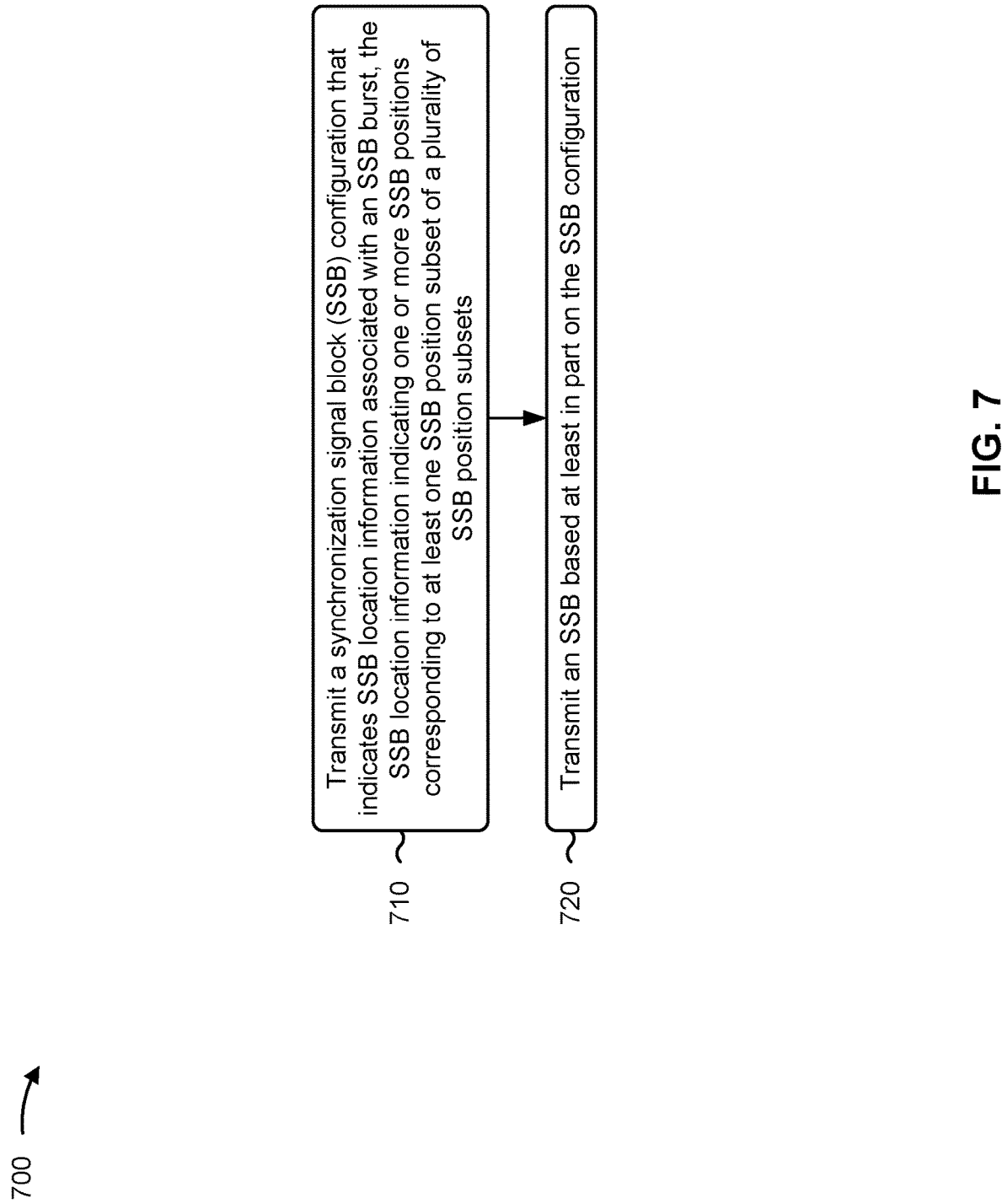

FIG. 7 is a diagram illustrating an example process 700 performed, for example, by a base station, in accordance with the present disclosure. Example process 700 is an example where the base station (e.g., base station 110) performs operations associated with SSB burst with multiple subsets.

As shown in FIG. 7, in some aspects, process 700 may include transmitting an SSB configuration that indicates SSB location information associated with an SSB burst, the SSB location information indicating one or more SSB positions corresponding to at least one SSB position subset of a plurality of SSB position subsets (block 710). For example, the base station (e.g., using communication manager 150 and/or transmission component 904, depicted in FIG. 9) may transmit an SSB configuration that indicates SSB location information associated with an SSB burst, the SSB location information indicating one or more SSB positions corresponding to at least one SSB position subset of a plurality of SSB position subsets, as described above.

As further shown in FIG. 7, in some aspects, process 700 may include transmitting an SSB based at least in part on the SSB configuration (block 720). For example, the base station (e.g., using communication manager 150 and/or transmission component 904, depicted in FIG. 9) may transmit an SSB based at least in part on the SSB configuration, as described above.

Process 700 may include additional aspects, such as any single aspect or any combination of aspects described below and/or in connection with one or more other processes described elsewhere herein.

In a first aspect, the at least one SSB position subset includes a first subset comprising at least one SSB beam corresponding to at least one SSB that is transmitted using a short control signal exemption.

In a second aspect, alone or in combination with the first aspect, a maximum number of SSB beams associated with the first subset is less than a maximum number of SSB beams associated with a transmission window.

In a third aspect, alone or in combination with one or more of the first and second aspects, a maximum number of SSB beams associated with the first subset is less than or equal to a maximum number of SSB beams that can be transmitted using short control signal exemption within a transmission window.

In a fourth aspect, alone or in combination with one or more of the first through third aspects, the first subset includes a plurality of contiguous SSB positions.

In a fifth aspect, alone or in combination with one or more of the first through third aspects, the first subset includes at least one pair of consecutive SSB positions that are not contiguous.

In a sixth aspect, alone or in combination with one or more of the first through fifth aspects, the at least one SSB position subset includes a second subset having an associated LBT condition for transmitting an SSB associated with the second subset.

In a seventh aspect, alone or in combination with the sixth aspect, a maximum number of SSB beams associated with the second subset is less than a maximum number of SSB beams associated with a transmission window.

In an eighth aspect, alone or in combination with one or more of the sixth through seventh aspects, the second subset is empty.

In a ninth aspect, alone or in combination with one or more of the sixth through eighth aspects, a transmission window corresponding to the SSB burst includes one SSB candidate position associated with the second subset.

In a tenth aspect, alone or in combination with the ninth aspect, process 700 includes determining that the LBT condition is satisfied by the one SSB candidate position, wherein transmitting the SSB comprises transmitting an SSB transmission corresponding to the one SSB candidate position based at least in part on determining that the LBT condition is satisfied by the one SSB candidate position.

In an eleventh aspect, alone or in combination with one or more of the sixth through tenth aspects, a transmission window corresponding to the SSB burst includes a plurality of SSB candidate positions associated with the second subset.

In a twelfth aspect, alone or in combination with the eleventh aspect, process 700 includes determining that the LBT condition is satisfied by at least one of the plurality of SSB candidate positions associated with the second subset, wherein transmitting the SSB comprises transmitting an SSB transmission based at least in part on determining that the LBT condition is satisfied by at least one of the plurality of SSB candidate positions associated with the second subset.

In a thirteenth aspect, alone or in combination with one or more of the sixth through twelfth aspects, the second subset includes a plurality of contiguous SSB positions.

In a fourteenth aspect, alone or in combination with one or more of the sixth through twelfth aspects, the second subset includes at least one pair of consecutive SSB positions that are not contiguous.

In a fifteenth aspect, alone or in combination with one or more of the first through fourteenth aspects, an SSB beam is associated with a first SSB position subset for the SSB burst, and wherein the SSB beam is associated with a second SSB position subset for an additional SSB burst.

In a sixteenth aspect, alone or in combination with one or more of the first through fifteenth aspects, process 700 includes determining that LBT condition associated with the SSB burst is satisfied, wherein transmitting the SSB comprises transmitting an SSB transmission based at least in part on determining that the LBT condition associated with the SSB burst is satisfied.

In a seventeenth aspect, alone or in combination with the sixteenth aspect, the SSB burst comprises a plurality of SSBs, and wherein transmitting the SSB comprises transmitting at least one of the plurality of SSBs based at least in part on determining that the LBT condition associated with the SSB burst is satisfied.

In an eighteenth aspect, alone or in combination with one or more of the first through seventeenth aspects, transmitting the SSB configuration comprises transmitting a configuration transmission that indicates the configuration, the configuration transmission comprising at least one of an RRC message, a MAC-CE, or a DCI transmission.

In a nineteenth aspect, alone or in combination with one or more of the first through eighteenth aspects, the SSB configuration comprises one or more configuration parameters, the one or more configuration parameters indicating at least one of one or more subset parameters corresponding to the at least one SSB position subset, an association between at least one SSB candidate position of the SSB burst and the at least one SSB position subset, or an LBT condition associated with the SSB burst.

In a twentieth aspect, alone or in combination with one or more of the first through nineteenth aspects, a first rate matching configuration corresponds to a first SSB position subset of the plurality of SSB position subsets, and wherein a second rate matching configuration corresponds to a second SSB position subset of the plurality of SSB position subsets.

In a twenty-first aspect, alone or in combination with one or more of the first through twentieth aspects, a first rate matching configuration corresponds to the SSB burst, and wherein a second rate matching configuration corresponds to a second SSB burst.

In a twenty-second aspect, alone or in combination with the twenty-first aspect, the second rate matching configuration corresponds to the second SSB burst based at least in part on a determination that the second SSB burst has an associated listen-before-talk condition.

In a twenty-third aspect, alone or in combination with one or more of the twenty-first through twenty-second aspects, the second rate matching configuration corresponds to the second SSB burst based at least in part on a determination that an association between at least one SSB candidate position of the second SSB burst and the at least one SSB position subset satisfies a rate matching condition.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
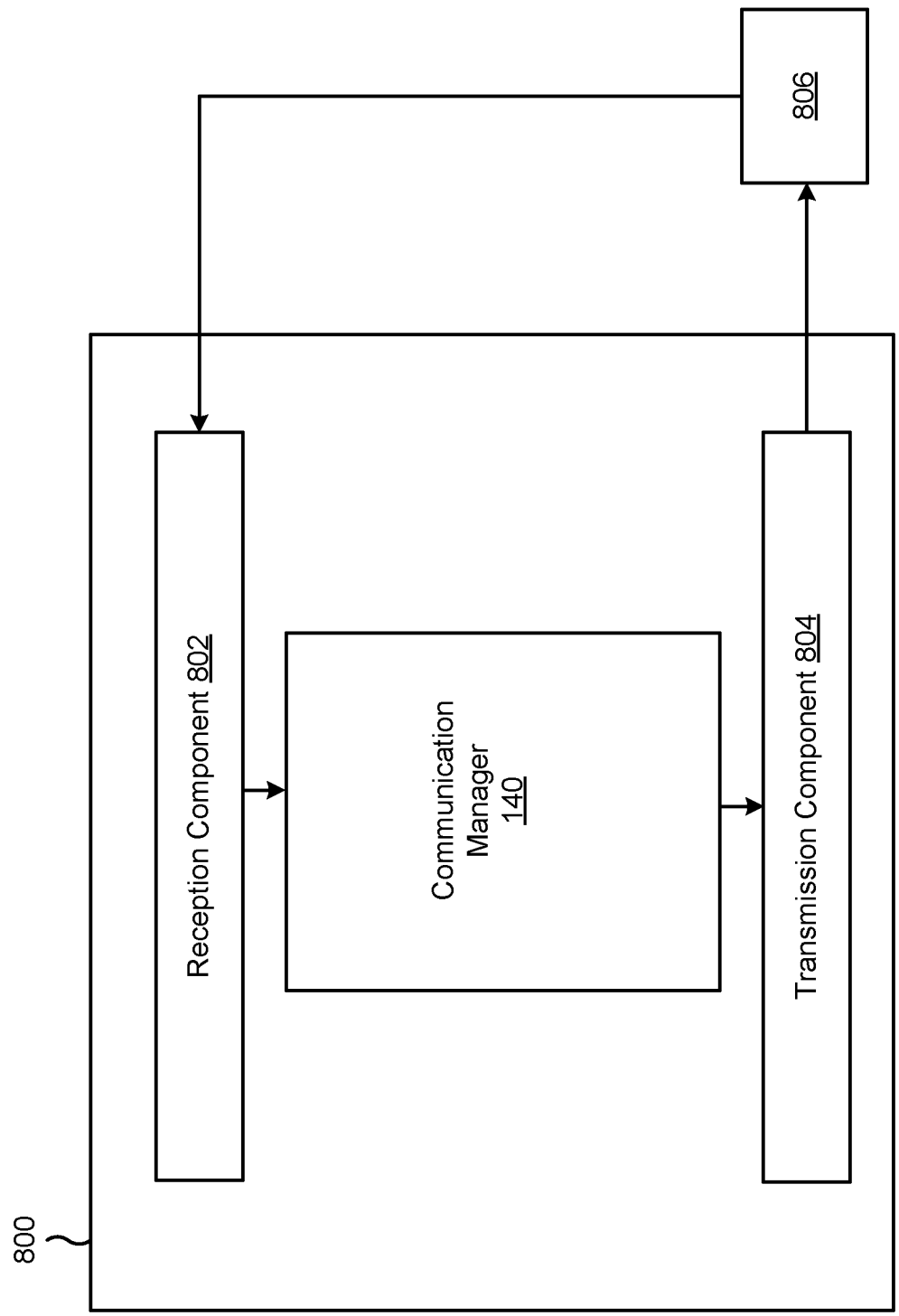
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may an SSB configuration that indicates SSB location information associated with an SSB burst, the SSB location information indicating one or more SSB positions corresponding to at least one SSB position subset of a plurality of SSB position subsets. The reception component 802 may receive an SSB based at least in part on the SSB configuration.

In some aspects, the communication manager 140 may be configured to manage operations of the reception component 802 and/or the transmission component. The communication manager 140 may be used for any number of other communication-related processing operations. In some aspects, the communication manager 140 may include one or more antennas, a modulator, a transmit MIMO processor, a transmit processor, a controller/processor, a memory, or a combination thereof, of the UE described above in connection with FIG. 2. In some aspects, the communication manager 140 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
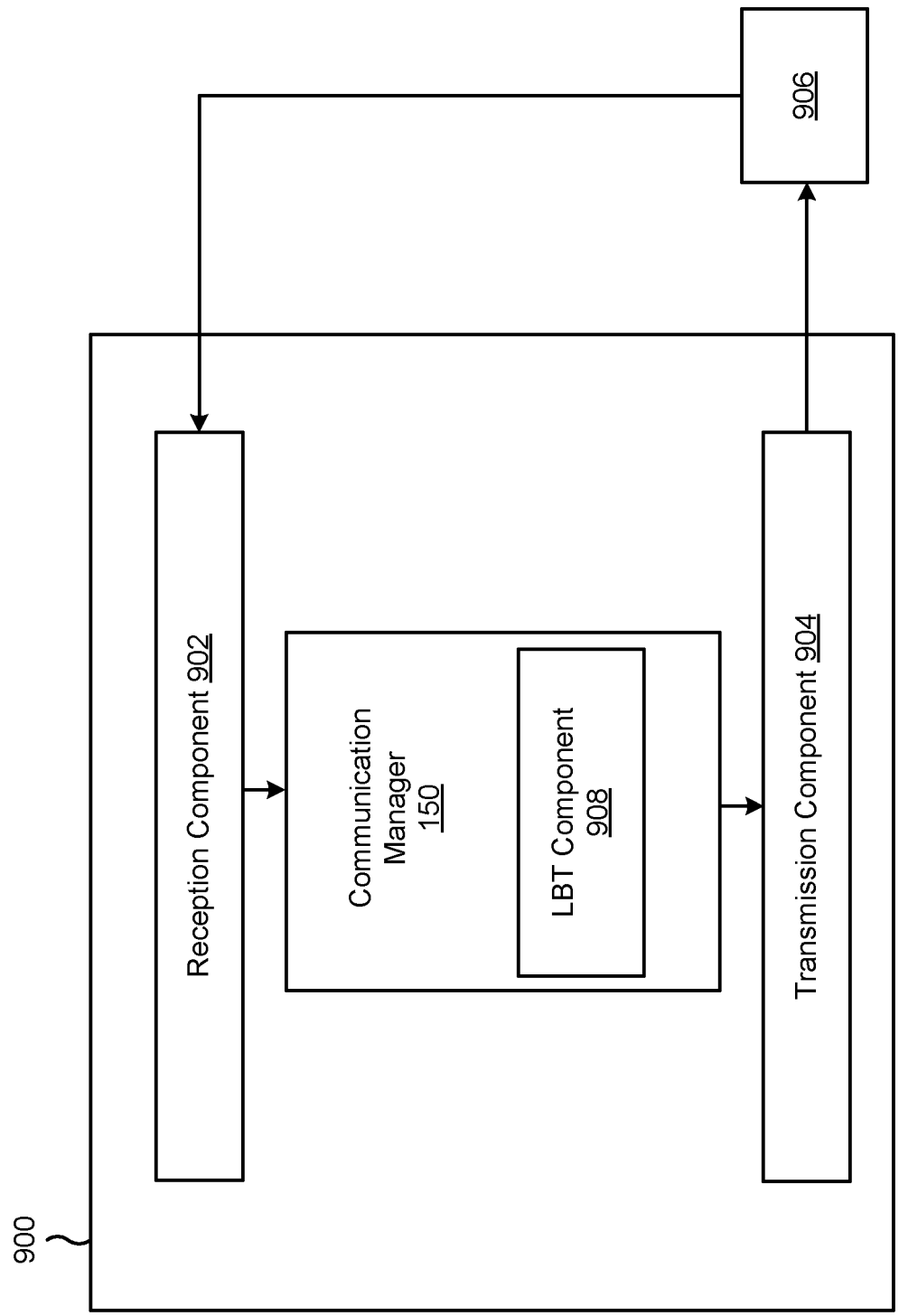

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include an LBT component 908.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit an SSB configuration that indicates SSB location information associated with an SSB burst, the SSB location information indicating one or more SSB positions corresponding to at least one SSB position subset of a plurality of SSB position subsets. The transmission component 904 may transmit an SSB based at least in part on the SSB configuration.

The LBT component 908 may determine that the LBT condition is satisfied by the one SSB candidate position, wherein transmitting the SSB comprises transmitting an SSB transmission corresponding to the one SSB candidate position based at least in part on determining that the LBT condition is satisfied by the one SSB candidate position. In some aspects, the LBT component 908 may include one or more antennas, a modulator, a transmit MIMO processor, a transmit processor, a controller/processor, a memory, or a combination thereof, of the base station described above in connection with FIG. 2. In some aspects, the LBT component 908 may include the reception component 902 and/or the transmission component 904.

The LBT component 908 may determine that the LBT condition is satisfied by at least one of the plurality of SSB candidate positions associated with the second subset, wherein transmitting the SSB comprises transmitting an SSB transmission based at least in part on determining that the LBT condition is satisfied by at least one of the plurality of SSB candidate positions associated with the second subset.

The LBT component 908 may determine that an LBT condition associated with the SSB burst is satisfied, wherein transmitting the SSB comprises transmitting an SSB transmission based at least in part on determining that the LBT condition associated with the SSB burst is satisfied.

In some aspects, the communication manager 150 may be configured to manage operations of the reception component 902 and/or the transmission component 904. The communication manager 150 may be used for any number of other communication-related processing operations. In some aspects, the communication manager 150 may include one or more antennas, a modulator, a transmit MIMO processor, a transmit processor, a controller/processor, a memory, or a combination thereof, of the base station described above in connection with FIG. 2. In some aspects, the communication manager 150 may include the reception component 902, the transmission component 904, and/or the LBT component.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving a synchronization signal block (SSB) configuration that indicates SSB location information associated with an SSB burst, the SSB location information indicating one or more SSB positions corresponding to at least one SSB position subset of a plurality of SSB position subsets; and receiving an SSB based at least in part on the SSB configuration.

Aspect 2: The method of Aspect 1, wherein the at least one SSB position subset includes a first subset comprising at least one SSB beam corresponding to at least one SSB that is transmitted using a short control signal exemption.

Aspect 3: The method of Aspect 2, wherein a maximum number of SSB beams associated with the first subset is less than a maximum number of SSB beams associated with a transmission window.

Aspect 4: The method of either of Aspects 2 or 3, wherein a maximum number of SSB beams associated with the first subset is less than or equal to a maximum number of SSB beams that can be transmitted using short control signal exemption within a transmission window.

Aspect 5: The method of any of Aspects 2-4, wherein the first subset includes a plurality of contiguous SSB positions.

Aspect 6: The method of any of Aspects 2-4, wherein the first subset includes at least one pair of consecutive SSB positions that are not contiguous.

Aspect 7: The method of any of Aspects 2-6, wherein the at least one SSB position subset includes a second subset having an associated listen-before-talk (LBT) condition for transmitting an SSB associated with the second subset.

Aspect 8: The method of Aspect 7, wherein a maximum number of SSB beams associated with the second subset is less than a maximum number of SSB beams associated with a transmission window.

Aspect 9: The method of either of Aspects 7 or 8, wherein the second subset is empty.

Aspect 10: The method of any of Aspects 7-9, wherein a transmission window corresponding to the SSB burst includes one SSB candidate position associated with the second subset.

Aspect 11: The method of Aspect 10, wherein receiving the SSB comprises receiving an SSB transmission corresponding to the one SSB candidate position based at least in part on a determination that the LBT condition is satisfied by the one SSB candidate position.

Aspect 12: The method of any of Aspects 7-11, wherein a transmission window corresponding to the SSB burst includes a plurality of SSB candidate positions associated with the second subset.

Aspect 13: The method of Aspect 12, wherein receiving the SSB comprises receiving an SSB transmission based at least in part on a determination that the LBT condition is satisfied by at least one of the plurality of SSB candidate positions associated with the second subset.

Aspect 14: The method of any of Aspects 7-13, wherein the second subset includes a plurality of contiguous SSB positions.

Aspect 15: The method of any of Aspects 7-13, wherein the second subset includes at least one pair of consecutive SSB positions that are not contiguous.

Aspect 16: The method of any of Aspects 1-15, wherein an SSB beam is associated with a first SSB position subset for the SSB burst, and wherein the SSB beam is associated with a second SSB position subset for an additional SSB burst.

Aspect 17: The method of any of Aspects 1-16, wherein receiving the SSB comprises receiving an SSB transmission based at least in part on a determination that a listen-before-talk (LBT) condition associated with the SSB burst is satisfied.

Aspect 18: The method of Aspect 17, wherein the SSB burst comprises a plurality of SSBs, and wherein receiving the SSB comprises receiving at least one of the plurality of SSBs transmitted based at least in part on the determination that the LBT condition associated with the SSB burst is satisfied.

Aspect 19: The method of any of Aspects 1-18, wherein receiving the SSB configuration comprises receiving a configuration transmission that indicates the configuration, the configuration transmission comprising at least one of: a radio resource control message, a medium access control control element, or a downlink control information transmission.

Aspect 20: The method of any of Aspects 1-19, wherein the SSB configuration comprises one or more configuration parameters, the one or more configuration parameters indicating at least one of: one or more subset parameters corresponding to the at least one SSB position subset, an association between at least one SSB candidate position of the SSB burst and the at least one SSB position subset, or a listen-before-talk condition associated with the SSB burst.

Aspect 21: The method of any of Aspects 1-20, wherein a first rate matching configuration corresponds to a first SSB position subset of the plurality of SSB position subsets, and wherein a second rate matching configuration corresponds to a second SSB position subset of the plurality of SSB position subsets.

Aspect 22: The method of any of Aspects 1-21, wherein a first rate matching configuration corresponds to the SSB burst, and wherein a second rate matching configuration corresponds to a second SSB burst.

Aspect 23: The method of Aspect 22, wherein the second rate matching configuration corresponds to the second SSB burst based at least in part on a determination that the second SSB burst has an associated listen-before-talk condition.

Aspect 24: The method of Aspect 23, wherein the second rate matching configuration corresponds to the second SSB burst based at least in part on a determination that an association between at least one SSB candidate position of the second SSB burst and the at least one SSB position subset satisfies a rate matching condition.

Aspect 25: A method of wireless communication performed by a base station, comprising: transmitting a synchronization signal block (SSB) configuration that indicates SSB location information associated with an SSB burst, the SSB location information indicating one or more SSB positions corresponding to at least one SSB position subset of a plurality of SSB position subsets; and transmitting an SSB based at least in part on the SSB configuration.

Aspect 26: The method of Aspect 25, wherein the at least one SSB position subset includes a first subset comprising at least one SSB beam corresponding to at least one SSB that is transmitted using a short control signal exemption.

Aspect 27: The method of Aspect 26, wherein a maximum number of SSB beams associated with the first subset is less than a maximum number of SSB beams associated with a transmission window.

Aspect 28: The method of either of Aspects 26 or 27, wherein a maximum number of SSB beams associated with the first subset is less than or equal to a maximum number of SSB beams that can be transmitted using short control signal exemption within a transmission window.

Aspect 29: The method of any of Aspects 26-28, wherein the first subset includes a plurality of contiguous SSB positions.

Aspect 30: The method of any of Aspects 26-28, wherein the first subset includes at least one pair of consecutive SSB positions that are not contiguous.

Aspect 31: The method of any of Aspects 26-30, wherein the at least one SSB position subset includes a second subset having an associated listen-before-talk (LBT) condition for transmitting an SSB associated with the second subset.

Aspect 32: The method of Aspect 31, wherein a maximum number of SSB beams associated with the second subset is less than a maximum number of SSB beams associated with a transmission window.

Aspect 33: The method of either of Aspects 31 or 32, wherein the second subset is empty.

Aspect 34: The method of any of Aspects 31-33, wherein a transmission window corresponding to the SSB burst includes one SSB candidate position associated with the second subset.

Aspect 35: The method of Aspect 34, further comprising determining that the LBT condition is satisfied by the one SSB candidate position, wherein transmitting the SSB comprises transmitting an SSB transmission corresponding to the one SSB candidate position based at least in part on determining that the LBT condition is satisfied by the one SSB candidate position.

Aspect 36: The method of any of Aspects 31-35, wherein a transmission window corresponding to the SSB burst includes a plurality of SSB candidate positions associated with the second subset.

Aspect 37: The method of Aspect 36, further comprising determining that the LBT condition is satisfied by at least one of the plurality of SSB candidate positions associated with the second subset, wherein transmitting the SSB comprises transmitting an SSB transmission based at least in part on determining that the LBT condition is satisfied by at least one of the plurality of SSB candidate positions associated with the second subset.

Aspect 38: The method of any of Aspects 31-37, wherein the second subset includes a plurality of contiguous SSB positions.

Aspect 39: The method of any of Aspects 31-37, wherein the second subset includes at least one pair of consecutive SSB positions that are not contiguous.

Aspect 40: The method of any of Aspects 25-39, wherein an SSB beam is associated with a first SSB position subset for the SSB burst, and wherein the SSB beam is associated with a second SSB position subset for an additional SSB burst.

Aspect 41: The method of any of Aspects 25-40, further comprising determining that a listen-before-talk (LBT) condition associated with the SSB burst is satisfied, wherein transmitting the SSB comprises transmitting an SSB transmission based at least in part on determining that the LBT condition associated with the SSB burst is satisfied.

Aspect 42: The method of Aspect 41, wherein the SSB burst comprises a plurality of SSBs, and wherein transmitting the SSB comprises transmitting at least one of the plurality of SSBs based at least in part on determining that the LBT condition associated with the SSB burst is satisfied.

Aspect 43: The method of any of Aspects 25-42, wherein transmitting the SSB configuration comprises transmitting a configuration transmission that indicates the configuration, the configuration transmission comprising at least one of: a radio resource control message, a medium access control control element, or a downlink control information transmission.

Aspect 44: The method of any of Aspects 25-43, wherein the SSB configuration comprises one or more configuration parameters, the one or more configuration parameters indicating at least one of: one or more subset parameters corresponding to the at least one SSB position subset, an association between at least one SSB candidate position of the SSB burst and the at least one SSB position subset, or a listen-before-talk condition associated with the SSB burst.

Aspect 45: The method of any of Aspects 25-44, wherein a first rate matching configuration corresponds to a first SSB position subset of the plurality of SSB position subsets, and wherein a second rate matching configuration corresponds to a second SSB position subset of the plurality of SSB position subsets.

Aspect 46: The method of any of Aspects 25-45, wherein a first rate matching configuration corresponds to the SSB burst, and wherein a second rate matching configuration corresponds to a second SSB burst.

Aspect 47: The method of Aspect 46, wherein the second rate matching configuration corresponds to the second SSB burst based at least in part on a determination that the second SSB burst has an associated listen-before-talk condition.

Aspect 48: The method of either of Aspects 46 or 47, wherein the second rate matching configuration corresponds to the second SSB burst based at least in part on a determination that an association between at least one SSB candidate position of the second SSB burst and the at least one SSB position subset satisfies a rate matching condition.

Aspect 49: An apparatus for wireless communication at a device, comprising a processor; memory coupled with the processor; and instructions stored in the memory and executable by the processor to cause the apparatus to perform the method of one or more of Aspects 1-24.

Aspect 50: A device for wireless communication, comprising a memory and one or more processors coupled to the memory, the one or more processors configured to perform the method of one or more of Aspects 1-24.

Aspect 51: An apparatus for wireless communication, comprising at least one means for performing the method of one or more of Aspects 1-24.

Aspect 52: A non-transitory computer-readable medium storing code for wireless communication, the code comprising instructions executable by a processor to perform the method of one or more of Aspects 1-24.

Aspect 53: A non-transitory computer-readable medium storing a set of instructions for wireless communication, the set of instructions comprising one or more instructions that, when executed by one or more processors of a device, cause the device to perform the method of one or more of Aspects 1-24.

Aspect 54: An apparatus for wireless communication at a device, comprising a processor; memory coupled with the processor; and instructions stored in the memory and executable by the processor to cause the apparatus to perform the method of one or more of Aspects 25-48.

Aspect 55: A device for wireless communication, comprising a memory and one or more processors coupled to the memory, the one or more processors configured to perform the method of one or more of Aspects 25-48.

Aspect 56: An apparatus for wireless communication, comprising at least one means for performing the method of one or more of Aspects 25-48.

Aspect 57: A non-transitory computer-readable medium storing code for wireless communication, the code comprising instructions executable by a processor to perform the method of one or more of Aspects 25-48.

Aspect 58: A non-transitory computer-readable medium storing a set of instructions for wireless communication, the set of instructions comprising one or more instructions that, when executed by one or more processors of a device, cause the device to perform the method of one or more of Aspects 25-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and
one or more processors coupled to the one or more memories, wherein the one or more memories include instructions executable by the one or more processors to cause the UE to:
receive a synchronization signal block (SSB) configuration that indicates SSB location information associated with an SSB burst, the SSB location information indicating one or more SSB positions corresponding to at least one SSB position subset of a plurality of SSB position subsets, wherein a maximum number of SSB beams associated with the at least one SSB position subset is less than a maximum number of SSB beams associated with a transmission window; and
receive an SSB based at least in part on the SSB configuration.

2. The UE of claim 1, wherein the at least one SSB position subset comprises at least one SSB beam corresponding to at least one SSB that is transmitted using a short control signal exemption.

3. The UE of claim 1, wherein the maximum number of SSB beams associated with the transmission window is a maximum number of SSB beams that can be transmitted using short control signal exemption within the transmission window.

4. The UE of claim 1, wherein the at least one SSB position subset includes a plurality of contiguous SSB positions.

5. The UE of claim 1, wherein the at least one SSB position subset includes at least one pair of consecutive SSB positions that are not contiguous.

6. The UE of claim 1, wherein the at least one SSB position subset includes a subset having an associated listen-before-talk (LBT) condition for transmitting an SSB associated with the subset having the associated LBT condition.

7. The UE of claim 6, wherein a maximum number of SSB beams associated with the subset having the associated LBT condition is less than the maximum number of SSB beams associated with the transmission window.

8. The UE of claim 6, wherein the subset having the associated LBT condition is empty.

9. The UE of claim 6, wherein a transmission window corresponding to the SSB burst includes one SSB candidate position associated with the subset having the associated LBT condition.

10. The UE of claim 9, wherein the one or more processors, to receive the SSB, are configured to receive an SSB transmission corresponding to the one SSB candidate position based at least in part on a determination that the LBT condition is satisfied by the one SSB candidate position.

11. The UE of claim 6, wherein a transmission window corresponding to the SSB burst includes a plurality of SSB candidate positions associated with the subset having the associated LBT condition.

12. The UE of claim 11, wherein the one or more processors, to receive the SSB, are configured to receive an SSB transmission based at least in part on a determination that the LBT condition is satisfied by at least one of the plurality of SSB candidate positions associated with the subset having the associated LBT condition.

13. The UE of claim 6, wherein the subset having the associated LBT condition includes a plurality of contiguous SSB positions.

14. The UE of claim 6, wherein the subset having the associated LBT condition includes at least one pair of consecutive SSB positions that are not contiguous.

15. The UE of claim 1, wherein an SSB beam is associated with a first SSB position subset for the SSB burst, and wherein the SSB beam is associated with a second SSB position subset for an additional SSB burst.

16. The UE of claim 1, wherein the one or more processors, to receive the SSB, are configured to receive an SSB transmission based at least in part on a determination that a listen-before-talk (LBT) condition associated with the SSB burst is satisfied.

17. The UE of claim 16, wherein the SSB burst comprises a plurality of SSBs, and wherein the one or more processors, to receive the SSB, are configured to receive at least one of the plurality of SSBs transmitted based at least in part on the determination that the LBT condition associated with the SSB burst is satisfied.

18. The UE of claim 1, wherein the one or more processors, to receive the SSB configuration, are configured to receive a configuration transmission that indicates the configuration, the configuration transmission comprising at least one of:
a radio resource control message,
a medium access control control element, or
a downlink control information transmission.

19. The UE of claim 1, wherein the SSB configuration comprises one or more configuration parameters, the one or more configuration parameters indicating at least one of:
one or more subset parameters corresponding to the at least one SSB position subset,
an association between at least one SSB candidate position of the SSB burst and the at least one SSB position subset, or
a listen-before-talk condition associated with the SSB burst.

20. The UE of claim 1, wherein a first rate matching configuration corresponds to a first SSB position subset of the plurality of SSB position subsets, and wherein a second rate matching configuration corresponds to a second SSB position subset of the plurality of SSB position subsets.

21. The UE of claim 1, wherein a first rate matching configuration corresponds to the SSB burst, and wherein a second rate matching configuration corresponds to another SSB burst.

22. The UE of claim 21, wherein the second rate matching configuration corresponds to the other SSB burst based at least in part on a determination that the other SSB burst has an associated listen-before-talk condition.

23. The UE of claim 22, wherein the second rate matching configuration corresponds to the other SSB burst based at least in part on a determination that an association between at least one SSB candidate position of the other SSB burst and the at least one SSB position subset satisfies a rate matching condition.

24. A base station for wireless communication, comprising:
one or more memories; and
one or more processors coupled to the one or more memories, wherein the one or more memories include instructions executable by the one or more processors to cause the base station to:
transmit a synchronization signal block (SSB) configuration that indicates SSB location information associated with an SSB burst, the SSB location information indicating one or more SSB positions corresponding to at least one SSB position subset of a plurality of SSB position subsets, wherein a maximum number of SSB beams associated with the at least one SSB position subset is less than a maximum number of SSB beams associated with a transmission window; and transmit an SSB based at least in part on the SSB configuration.

25. The base station of claim 24, wherein the at least one SSB position subset comprises at least one SSB beam corresponding to at least one SSB that is transmitted using a short control signal exemption.

26. The base station of claim 24, wherein the maximum number of SSB beams associated with the transmission window is a maximum number of SSB beams that can be transmitted using short control signal exemption within the transmission window.

27. A method of wireless communication performed by a user equipment (UE), comprising:

receiving a synchronization signal block (SSB) configuration that indicates SSB location information associated with an SSB burst, the SSB location information indicating one or more SSB positions corresponding to at least one SSB position subset of a plurality of SSB position subsets, wherein a maximum number of SSB beams associated with the at least one SSB position subset is less than a maximum number of SSB beams associated with a transmission window; and receiving an SSB based at least in part on the SSB configuration.

28. The method of claim 27, wherein the at least one SSB position subset comprises at least one SSB beam corresponding to at least one SSB that is transmitted using a short control signal exemption.

29. A method of wireless communication performed by a base station, comprising:

transmitting a synchronization signal block (SSB) configuration that indicates SSB location information associated with an SSB burst, the SSB location information indicating one or more SSB positions corresponding to at least one SSB position subset of a plurality of SSB position subsets, wherein a maximum number of SSB beams associated with the at least one SSB position subset is less than a maximum number of SSB beams associated with a transmission window; and transmitting an SSB based at least in part on the SSB configuration.

30. The method of claim 29, wherein the at least one SSB position subset comprises at least one SSB beam corresponding to at least one SSB that is transmitted using a short control signal exemption.

* * * * *